United States Patent [19]

Buinewicz

[11] Patent Number: 4,657,624

[45] Date of Patent: Apr. 14, 1987

[54] APPARATUS FOR PROCESSING CORRUGATED PAPERBOARD

[75] Inventor: Benedict R. Buinewicz, Villanova, Pa.

[73] Assignee: Molins Machine Company, Inc., Cherry Hill, N.J.

[21] Appl. No.: 693,919

[22] Filed: Jan. 23, 1985

Related U.S. Application Data

[62] Division of Ser. No. 550,708, Nov. 14, 1983, Pat. No. 4,529,462.

[51] Int. Cl.[4] .............................. B31F 1/20; B32B 3/28

[52] U.S. Cl. ...................................... 156/470; 156/510; 156/547; 156/548

[58] Field of Search ................ 156/470, 205, 553, 207, 156/209, 210, 510, 547, 548; 493/407, 463, 464; 428/183, 186; 425/369, 396, 385

[56] References Cited

U.S. PATENT DOCUMENTS 1,444,397 2/1923 Seigle .................................. 428/183
2,758,047 8/1956 Dowd .................................. 428/183
2,885,073 5/1959 Bettoli et al. .................... 428/186 X
2,949,151 8/1960 Goldstein ......................... 156/207 X
3,077,222 2/1963 Shanley ............................ 428/186 X
3,112,184 11/1963 Hollenbach .......................... 264/286
3,122,976 3/1964 Anderson ......................... 493/407 X
3,867,225 2/1975 Nystrand ............................. 156/209
3,972,763 8/1976 Wolvin et al. ....................... 156/210
4,288,273 9/1981 Butler, Jr. et al. ............. 156/470 X
4,339,292 7/1982 Itoh et al. ........................ 156/210 X

FOREIGN PATENT DOCUMENTS 1214521 4/1966 Fed. Rep. of Germany ...... 493/463

*Primary Examiner*—Donald Czaja
*Assistant Examiner*—Ramon R. Hoch
*Attorney, Agent, or Firm*—Seidel, Gonda, Goldhammer & Abbott

[57] ABSTRACT

At a location between a single facer machine and a glue machine, a web of corrugated paperboard has the flutes crushed in a narrow zone longitudinally of the web. A bonding agent is applied only to the uncrushed flutes. Preprinted liners are applied to the bonding agent on the uncrushed flutes with the liners being spaced from one another by said narrow zone.

6 Claims, 5 Drawing Figures

APPARATUS FOR PROCESSING CORRUGATED PAPERBOARD

This is a division of application Ser. No. 550,708 filed Nov. 14, 1983 now U.S. Pat. No. 4,529,462.

BACKGROUND OF THE INVENTION

In a corrugator, a bridge is provided to facilitate feeding a continuous web of single face paperboard from a single facer machine to a glue machine. At the glue machine, a bonding agent is applied to the crests of the web flutes and then a liner is applied to the bonding agent.

When it is desired to apply two liners to the flutes and wherein the combined width of the liners is less than the width of the web, there is presented a problem. A conventional glue machine will apply the bonding agent to the entire length of the crest of each flute. That portion of the flutes to which a liner is not attached will create problems downstream from the glue machine since an exposed bonding agent will contaminate downstream equipment or otherwise interfere with the proper operation of the corrugator. The present invention is directed to a solution of the problem so that a conventional glue machine may be utilized as part of the corrugator.

SUMMARY OF THE INVENTION

The apparatus of the present invention is directed to a corrugator wherein a bridge is located between a single facer machine and a glue machine. The bridge is adapted to feed a web of single face paperboard from the single facer machine to the glue machine. A means is provided upstream from the glue machine for longitudinally crushing a narrow portion of the flutes on the flute side of the web. A means is associated with the glue machine for applying at least two liners to the uncrushed flutes on the web so that the crushed flutes are between adjacent liners.

In accordance with the method of the present invention flutes on a moving web of single face paperboard are crushed at a narrow zone on the web in a longitudinal direction of the web. A bonding agent is applied only to the uncrushed flutes. Thereafter, preprinted liners are applied to the bonding agent to thereby provide double face corrugated paperboard having a pair of liners transversely spaced by said zone.

The object of the present invention is to provide apparatus and method for producing a web of corrugated paperboard having at least two spaced liners on one side without applying a bonding agent to the exposed flutes between the liners. Other objects and advantages will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
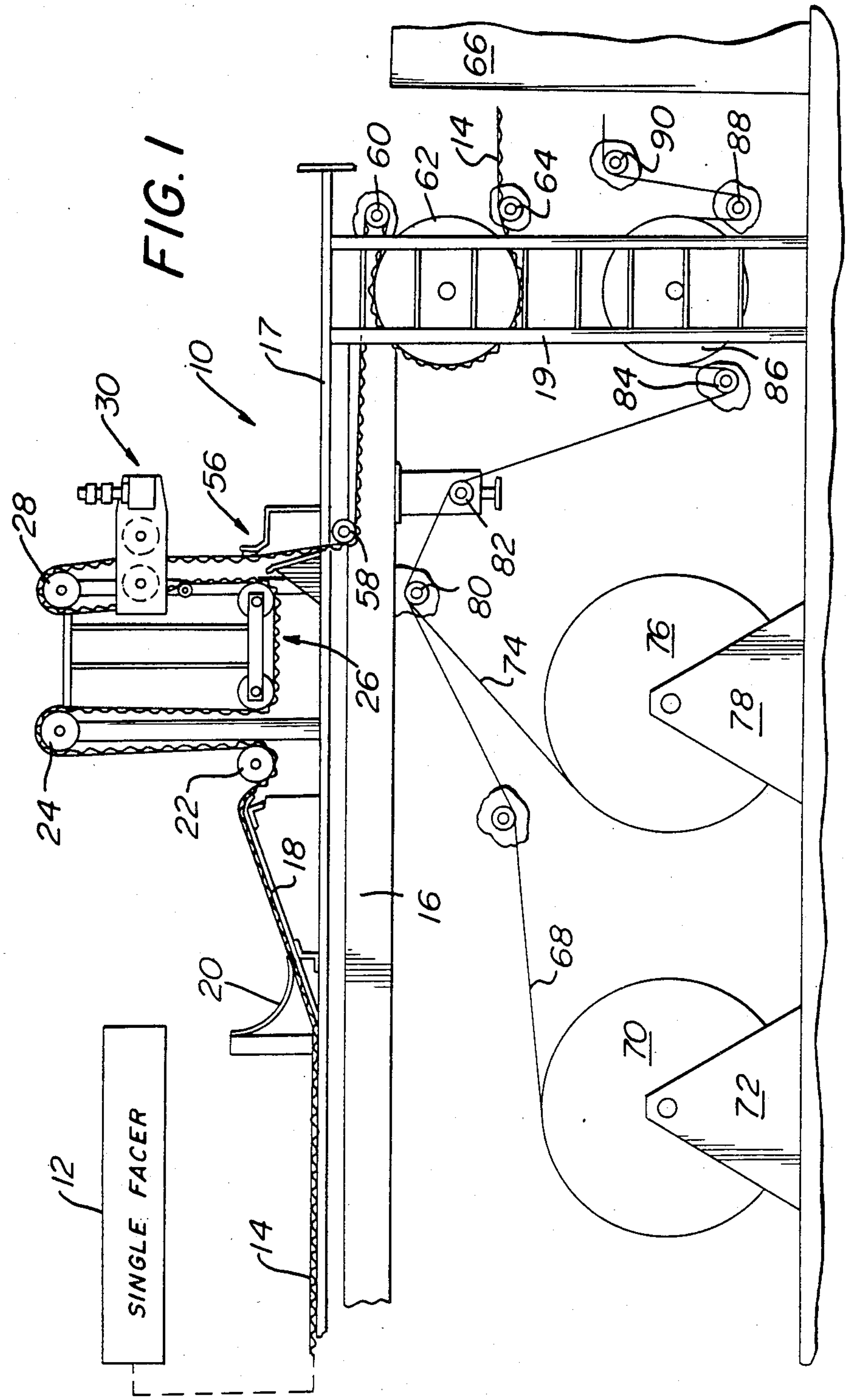
FIG. 1 is a side elevation view of the downstream end of a bridge.

Referring to the drawing in detail, where like numerals indicate like elements, there is shown the upstream end portion of a corrugator 10. A single facer machine 12 produces a single face web 14 which is fed to the bridge 16. Bridge 16 includes a catwalk 17 with an access ladder 19. On the downstream end portion of the bridge 16, the web 14 passes under a drag belt 20 as it passes up a ramp 18 and downwardly around a drag roller 22. From roller 22 the web 14 passes upwardly over idler roller 24 and then downwardly to a steering mechanism 26. Steering mechanism includes a pair of idler rollers which may be skewed so as to steer the web 14 and compensate for side drift. The web 14 passes upwardly from mechanism 26 around idler roller 28 and downwardly to a crusher mechanism 30.

Figure 3:
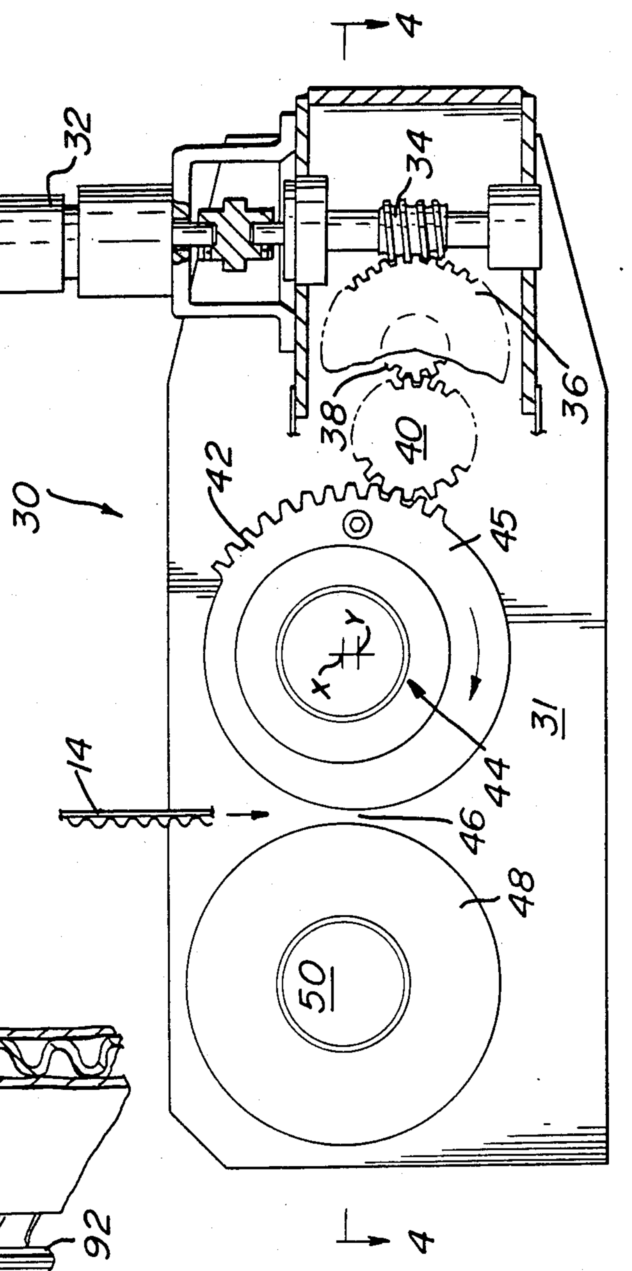
FIG. 3 is an enlargement of the flute crusher shown in FIG. 1 and partly in section.
Figure 5:
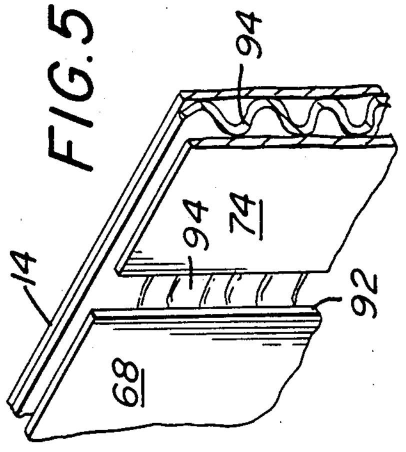
FIG. 5 is a partial perspective view of a web of corrugated paperboard having spaced liners on one side.
Figure 4:
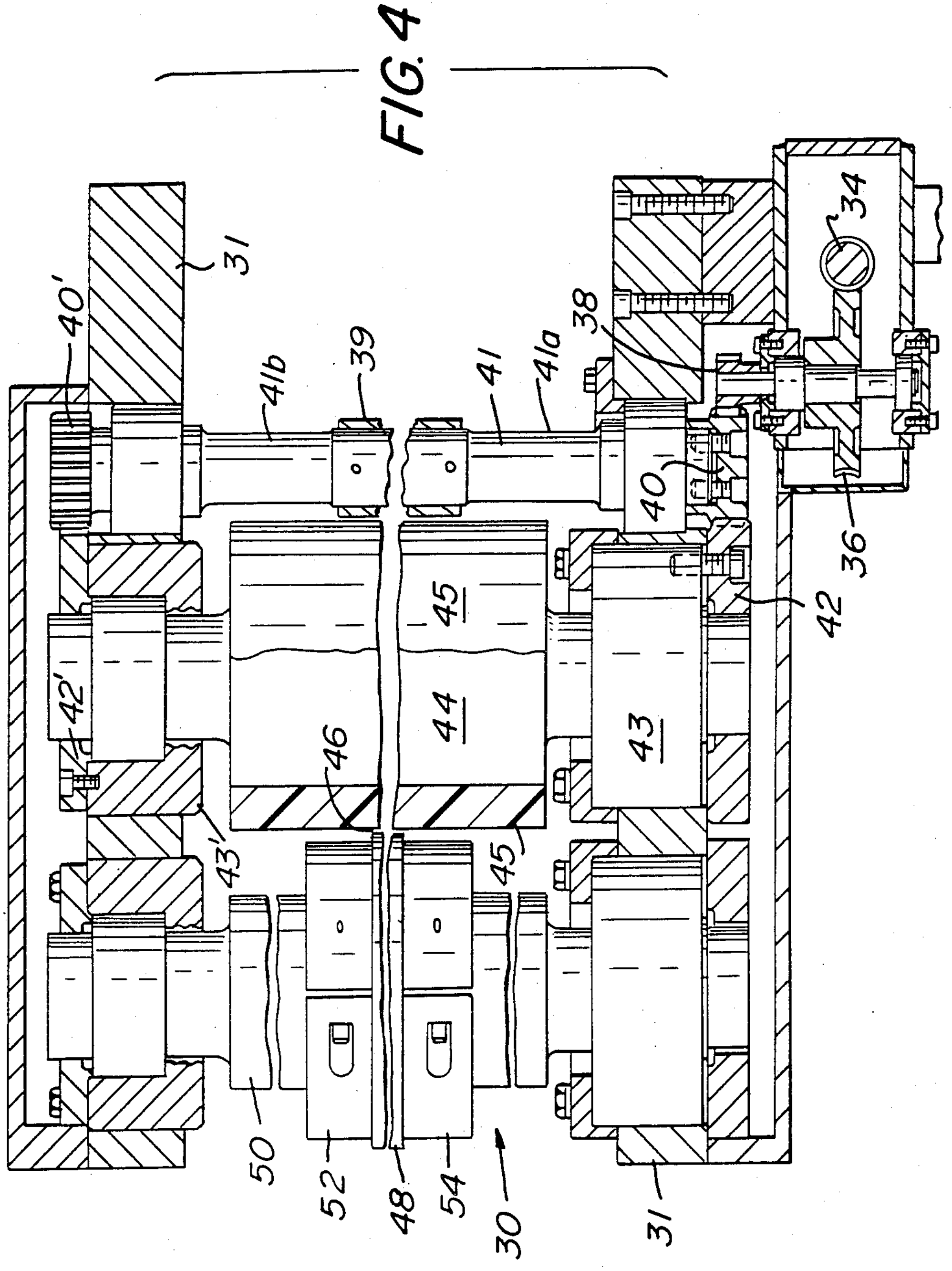
FIG. 4 is a sectional view taken along the line 4—4 in FIG. 3.

As shown more clearly in FIGS. 3 and 4, the crusher mechanism 30 includes a frame 31 supporting an air motor 32. Motor 32 is connected by way of a coupling to worm 34. Worm 34 meshes with a worm wheel 36. As shown more clearly in FIG. 4, worm wheel 36 and pinion 38 are mounted on a common shaft 35. Pinion 38 is meshed with gear 40 on one end of shaft 41.

Shaft 41 is comprised of sections 41*a* and 41*b* connected together by a sleeve coupling 39. Gear 40 on section 41*a* is meshed with a gear segment 42 on eccentric mounting 43 for one end of shaft 44. The axis of shaft 44 is designated X and the axis of mounting 43 is designated Y in FIG. 3. Gear 40' on section 41*b* is meshed with a gear segment 42' on eccentric mounting 43' for the other end of shaft 44. A pressure roller 45 is provided on shaft 44. The periphery of pressure roller 45 is spaced from the periphery of a crushing roller 48 by a gap 46 through which the web 14 passes. The width of gap 46 is adjustable by rotating the eccentric mountings 43, 43' by motor 32 via elements 39, 40, 40', 42, 42'.

The crushing roller 48 is mounted on a shaft 50 whose ends are removably supported by bearings in the frame 31. The exact location of the crushing roller 48 on shaft 50 is maintained by a pair of split locking collars 52, 54. Collars 52, 54 facilitate adjusting the location of crushing roller 48 along the shaft 50 and also facilitate accomodating rollers 48 of different axial widths.

Referring again to FIG. 1, after the web 14 leaves the crusher mechanism 30 it passes through a guide 56 and around idler rollers 58, 60 to a heating drum 62. From the heating drum 62, the web 14 passes over an idler roller 64 and enters a glue machine 66. In a conventional glue machine 66 and in a conventional corrugator, a liner having a width corresponding to the width of web 14 would be adhesively bonded thereto by application of a bonding agent such as an adhesive to the crests of the flutes on web 14.

In accordance with the present invention however, a pair of liners having a combined width less than the width of web 14 will be bonded to the crests of the flutes on web 14. As shown in FIG. 1, a liner 68 extends from a roll 70 supported by roll stand 72. Also, a liner 74 extends from a roll 76 on roll stand 78. As shown more clearly in FIG. 2, the rolls 70, 76 are offset with respect to web 14 and machine 66. If desired, rolls 70, 76 may be mounted on a common mandrel supported by either of the stands 72, 78.

The liners 68 and 74 extend over idler rollers 80, 82 and then to the idler rollers 84, 88 on opposite sides of a heating drum 86. Thereafter, the liners pass upwardly over idler roller 90 and into the glue machine 66.

Figure 2:
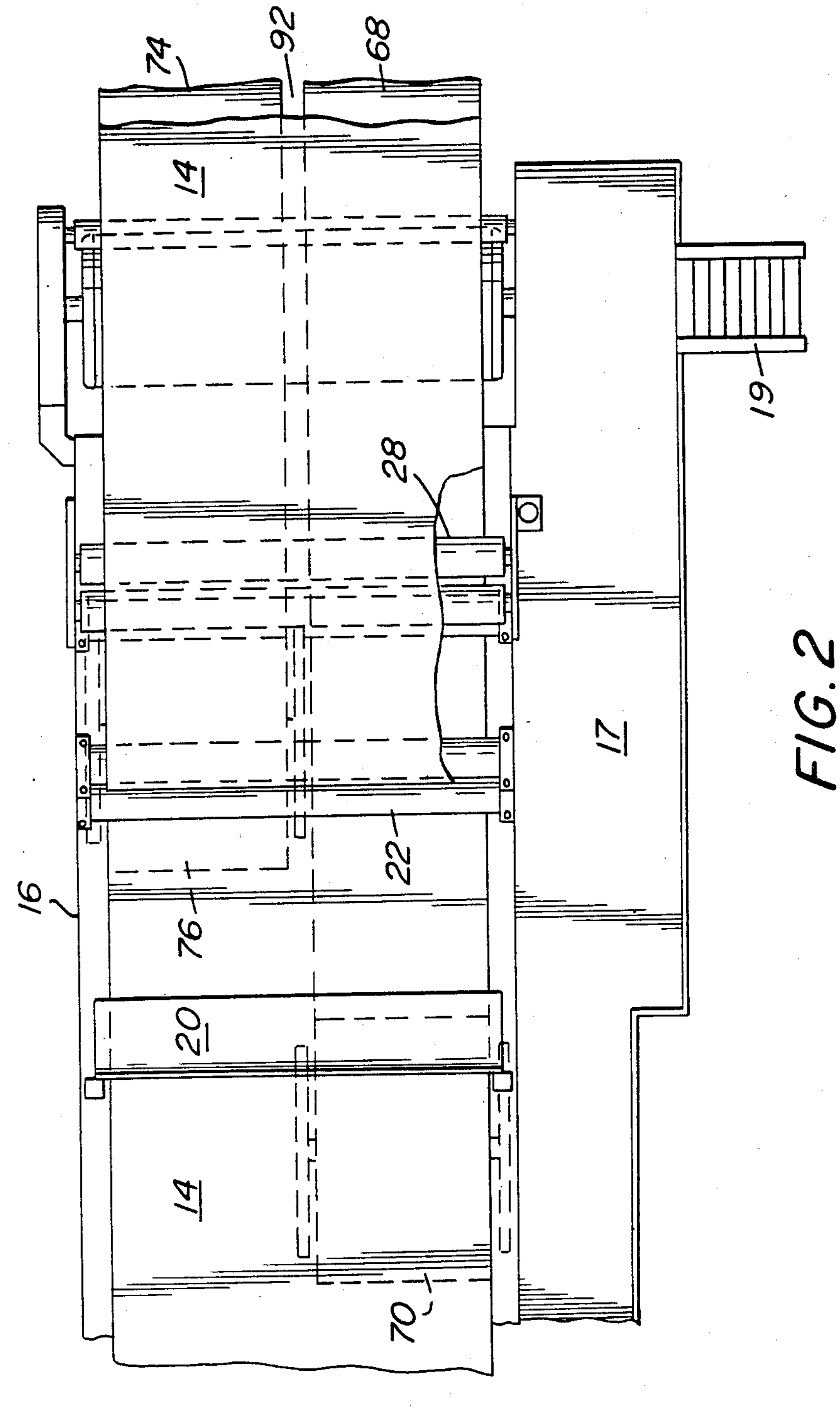
FIG. 2 is a top plan view of the bridge shown in FIG. 1.

As shown at the right hand end of FIG. 2, the adjacent side edges of the liners 68, 74 are spaced by a gap 92. Gap 92 corresponds to the width of the crushing roller 48. The width of gap 92 is generally one to fifteen centimeters. After exiting from the glue machine 66, the web is processed in a normal manner.

DESCRIPTION OF OPERATION

The drag belt 20 and drag roller 22 provide tension whereby the mechanism 26 may steer the web 14 in a transverse direction. As a result thereof, roller 48 will be at the desired spatial relationship with respect to the side edges of the web 14. As web 14 passes downwardly through the gap 46, rollers 45, 48 crush the flutes 94 in a zone longitudinally in the web 14 with the width of the zone corresponding to the width of the roller 48. The amount of crush will vary with the type of flute contour. With a C-flute contour, the amount of the crush may be up to three millimeters. The object is to crush a longitudinally extending zone of the flutes 94 by an amount such that the portion of the flutes in the zone will be out of contact with a roller which applies a bonding agent to the crest of the flutes in the glue machine 66.

At the glue machine 66, liner 68 will be bonded to the crests of uncrushed flutes 94. Likewise, liner 74 will be bonded to the crests of uncrushed flutes 94 with a gap 92 between the liners 68, 74. At a slitting station downstream from the glue machine 66, the portion of the web 14 corresponding to the gap 92 will be slit and scrapped.

The liners 68 and 74 are preferably pre-printed liners. The number of liners 68 and 74 may be two or more. Depending on the number of liners applied to the web 14, there will be at least one gap 92. If there are three liners, there will be two gaps 92. In order to process paperboard on a commercial basis, several relationships are inter-related. Some means is needed to properly direct the web 14 to the crusher 30 whereby crusher 30 will crush a narrow zone of the flutes 94 at the intended location with respect to the side edges of the web 14. The rolls 76 and 70 must be orientated with respect to the web 14 so as to space the gap 92 between the liners 68, 74 and cause said gap 92 to coincide with the zone of crushed flutes 94.

The present invention may be embodied in other specific forms without departing from the spirit or essential attributes thereof and, accordingly, reference should be made to the appended claims, rather than to the foregoing specification, as indicating the scope of the invention.

I claim:

1. In a corrugator wherein a bridge is located between a single facer machine and a glue machine and adapted to feed a web of single face paperboard to the glue machine, means located between the single facer machine and the glue machine for longitudinally crushing a narrow portion of the flutes on the flute side of the web, and means associated with the glue machine for applying at least two liners to the uncrushed flutes on the web so that only crushed flutes are uncovered between adjacent longitudinal sides of the liners and said liners being side-by-side and transversely spaced by said narrow portion of crushed flutes.

2. In a corrugator in accordance with claim 1 wherein said flute crushing means includes mating rollers, one of said rollers being adjustably mounted on a shaft in a manner which facilitates adjustment of the roller to a desired location along the shaft.

3. In a corrugator in accordance with claim 1 wherein said last mentioned means includes at least one support stand for supporting at least two rolls of liner material transversely offset with respect to said glue machine.

4. In a corrugator in accordance with claim 1 wherein said crushing means includes a pair of mating rollers defining a gap therebetween through which the web must pass, and means for adjusting one of said rollers relative to the other to vary the size of the gap.

5. In a corrugator wherein a bridge is located between a single facer machine and a glue machine and adapted to feed a web of single faced paperboard to the glue machine, means located between the single facer machine and the glue machine for longitudinally crushing a narrow portion of the flutes on the flute side of the web, said crushing means including a pair of mating rollers defining a gap therebetween through which the web must pass, means for adjusting one of said rollers relative to the other to adjust the size of the gap, one of said rollers being adjustably mounted on a shaft in a manner which facilitates adjustment to a desired location along the shaft, and applying means associated with the glue machine for applying at least two liners to the uncrushed flutes on the web so that only crushed flutes are uncovered between adjacent longitudinal side edges of the liners and said liners being side-by-side and transversely spaced by said narrow portion of crushed flutes, said applying means including first and second liner support stands for supporting a roll of liner material, said support stands being transversely staggered with respect to said glue machine.

6. In a corrugator in accordance with claim 5 wherein said bridge supports said crushing means adjacent to but downstream from means for steering said web so that said narrow portion will be located at a predetermined distance from a side edge of said web.

* * * * *